(12) United States Patent
Liang et al.

(10) Patent No.: US 11,833,786 B2
(45) Date of Patent: Dec. 5, 2023

(54) STONE PAPER AND MANUFACTURING METHOD THEREOF

(71) Applicant: TAIWAN LUNG MENG ADVANCED COMPOSITE MATERIALS CO., LTD., Tainan (TW)

(72) Inventors: Shih-Huei Liang, Tainan (TW); Ding-Shyan Ho, Tainan (TW)

(73) Assignee: TAIWAN LUNG MENG ADVANCED COMPOSITE MATERIALS CO., LTD., Tainan (TW)

( * ) Notice: Subject to any disclaimer, the term of this patent is extended or adjusted under 35 U.S.C. 154(b) by 194 days.

(21) Appl. No.: 17/032,914

(22) Filed: Sep. 25, 2020

(65) Prior Publication Data
US 2021/0094262 A1 Apr. 1, 2021

(30) Foreign Application Priority Data
Sep. 26, 2019 (TW) ................................. 108134939

(51) Int. Cl.
*B32B 19/04* (2006.01)
*B32B 27/36* (2006.01)
(Continued)

(52) U.S. Cl.
CPC ........ *B32B 19/045* (2013.01); *B29C 48/0018* (2019.02); *B29C 48/21* (2019.02);
(Continued)

(58) Field of Classification Search
CPC ... B32B 19/02; B32B 27/36; C08K 2003/265; C08J 5/18; C08L 67/02; C08L 2367/02; B29C 48/21
See application file for complete search history.

(56) References Cited

U.S. PATENT DOCUMENTS

2014/0135423 A1 5/2014 Chou
2014/0209231 A1* 7/2014 Schappert ............ B41M 5/5254
156/60

FOREIGN PATENT DOCUMENTS

CN 201835184 U 5/2011
CN 108301254 A 7/2018
(Continued)

OTHER PUBLICATIONS

Search report for TW108134939, dated Nov. 6, 2020, Total of 1 page.
(Continued)

*Primary Examiner* — Kregg T Brooks
(74) *Attorney, Agent, or Firm* — Apex Juris, pllc; Hilde Coeckx (57) ABSTRACT

A stone paper includes a first material layer and a second material layer. The first material layer includes a first inorganic material, a first plastic material, and an additive, wherein the first inorganic material, the first plastic material, and the additive are mixed together. The second material layer is coextruded on at least one surface of the first material layer, and the second material layer includes a second inorganic material, a nonmetal thermoconductive material, and a second plastic material, wherein the second inorganic material, the nonmetal thermoconductive material, and the second plastic material are mixed together. A manufacturing method of a stone paper is also disclosed herein.

6 Claims, 9 Drawing Sheets

(51) Int. Cl.
  *B29C 48/21* (2019.01)
  *C08K 3/01* (2018.01)
  *B32B 27/32* (2006.01)
  *B32B 9/04* (2006.01)
  *B29C 48/00* (2019.01)
  *B32B 9/00* (2006.01)
  *C08L 67/02* (2006.01)
  *C08J 5/18* (2006.01)
  *B32B 19/02* (2006.01)
  *B29K 105/16* (2006.01)
  *C08K 3/26* (2006.01)

(52) U.S. Cl.
  CPC .............. *B32B 9/002* (2013.01); *B32B 9/045* (2013.01); *B32B 19/02* (2013.01); *B32B 27/32* (2013.01); *B32B 27/36* (2013.01); *C08J 5/18* (2013.01); *C08K 3/01* (2018.01); *C08L 67/02* (2013.01); *B29K 2105/16* (2013.01); *B32B 2260/025* (2013.01); *B32B 2260/046* (2013.01); *B32B 2264/10* (2013.01); *B32B 2307/75* (2013.01); *C08K 2003/265* (2013.01)

(56) References Cited

FOREIGN PATENT DOCUMENTS

JP      2006334966 A     12/2006
WO    WO-2018114891 A1 *   6/2018   ........... B29C 48/022

OTHER PUBLICATIONS

English abstract for CN108301254, Total of 1 page.
English abstract for CN201835184, Total of 1 page.
Office Action for JP2020-161512, dated Sep. 7, 2020, Total of 7 pages.
English abstract for JP2006334966, Total of 1 page.
Office Action for TW10921060730, dated Nov. 6, 2020, Total of 10 pages.

* cited by examiner

STONE PAPER AND MANUFACTURING METHOD THEREOF

BACKGROUND OF THE INVENTION

Technical Field

The present invention relates generally to a stone paper, and more particularly to a heat resistant, antistatic, and thermoconductive stone paper that could be used for printing, and the manufacturing method thereof.

Description of Related Art

Conventional paper for printing is made from pulp, and the pulp is made from wood fiber. Although a part of paper manufacturer makes efforts to obtain FSC certification (issued by Forest Stewardship Council), most of environmental organizations still suggest reducing the usage of paper sheet in order to prevent deforestation, because trees grow very slow.

Nowadays, electric devices develop rapidly and bring a lot of convenience to modern people, but modern people has gotten used to take note and to draft on paper. Therefore, the usage of the paper made from pulp can't be effectively cut down, so that the deforestation can't be prevented.

As a result, some manufacturers produce synthesized plastic papers and anticipate that it could replace the paper made from pulp to retard the deforestation. However, the plastic papers has a high production costs, and the plastic paper doesn't have fiber, so that its texture is dissimilar to the texture of traditional papers and is just like a plastic. Moreover, the plastic paper can not withstand a high temperature, so that it can't replace the printing paper made from pulp. For instance, the plastic paper of 60-100 g can only be printed by a wed press, but can't be printed by a business used planographic printing printer, so that an application of said plastic paper is restricted, and it is unable to replace the conventional paper made from pulp.

In conclusion, the conventional paper that could be printed by the printer is made from pulp, but producing the pulp needs to fell trees, causing damage to forest environment. On the other hands, the plastic paper has bad heat resistant ability, so that it cannot be easily used by business used printer. Therefore, both the pulp paper and the synthesized plastic paper still have room to improve in order to overcome the existing problems described above.

BRIEF SUMMARY OF THE INVENTION

In view of the above, the primary objective of the present invention is to provide a stone paper, wherein a main ingredient thereof include an inorganic stone powder which is made by grinding a natural stone, and a little of plastic is added for binding. Therefore, it could completely avoid using wood pulp. Besides, the stone paper provided by the present invention is compounded with a nonmetal thermoconductive material in order to provide a significantly thermoconductive and anti-static performances. In this way, the stone paper provided by the present invention could have greatly heat resistance, and could avoid static cling, so that it could be used by a printer or printing apparatus on the market.

The present invention provides a stone paper includes a first material layer and at least one second material layer. The first material layer includes a first inorganic material, a first plastic material, and an additive which are mixed together. The at least one second material layer disposed on at least one surface of the first material layer, wherein the second material layer comprises a second inorganic material, a nonmetal thermoconductive material, and a second plastic material which are mixed together.

In addition, another primary objective of the present invention is to provide a stone paper includes a material layer, wherein the material layer includes a first inorganic material, a first plastic material, and an additive which are mixed together. The first inorganic material is an inorganic powder with a grain size of 2-10 micrometer(m), and the first plastic material is consisted of Amorphous Polyethylene Terephthalate (APET) and Poly (ethylene terephthalateco-1,4-cylclohexylenedimethylene terephthalate) (PETG).

The present invention further provides a manufacturing method of a stone paper including at least following steps:

providing a first soft material, wherein the first soft material comprises a first inorganic material, a first plastic material, and an additive which are mixed with one another;

providing a second soft material, wherein the second soft material comprises a second inorganic material, a nonmetal thermoconductive material, and a second plastic material which are mixed with one another; and coextruding the first soft material and the second soft material to form a coextruded sheet material, and stretching the coextruded sheet material, wherein the coextruded sheet material has a longitudinal direction and a short direction which are on a same plane and are perpendicular to each other. A length of the coextruded sheet material in the longitudinal direction is stretched, and a width of the coextruded sheet material in the short direction is stretched and heat set by a segmental process.

The present invention further provides a stone paper manufacturing system which is adapted to apply said manufacturing method of the stone paper, comprising a first material mixing apparatus, a second material mixing apparatus, a coextrusion die, and a length stretching apparatus. The first material mixing apparatus adapted to provide the first soft material. The second material mixing apparatus adapted to provide the second soft material. The coextrusion die which is connected to the first material mixing apparatus and the second material mixing apparatus respectively and is adapted to stack the second soft material upon at least one surface of the first soft material thereby to form the coextruded sheet material. The length stretching apparatus which is connected to the coextrusion die and is adapted to compress and stretch the coextruded sheet material, wherein the coextruded sheet material has the longitudinal direction and the short direction on the same plane, and the short direction is perpendicular to the longitudinal direction. The length of the coextruded sheet material in the longitudinal direction is stretched, and the width of the coextruded sheet material in the short direction is stretched and heat set by the segmental process.

With the stone paper made from the inorganic powder made by the grinding natural stone, the nonmetal thermoconductive material, and a little of the plastic material for binding the materials, the stone paper provided by the present invention could completely avoid using wood pulp. Besides, since the stone paper provided by the present invention is mixed with the nonmetal thermoconductive material, the stone paper could have significant thermoconductive, heat resistant, and anti-static abilities, thereby could be directly used by the printer and printing apparatus on the market. Moreover, the manufacturing method of the stone paper provided by the present invention includes the segmental process utilized to stretch and heat set the width in the short direction of the coextruded sheet material. In this way, the stone paper made by the manufacturing method of the stone paper provided by the present invention could have greater heatproof and anti-static abilities and could be directly used by the printer and printing apparatus on the market.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
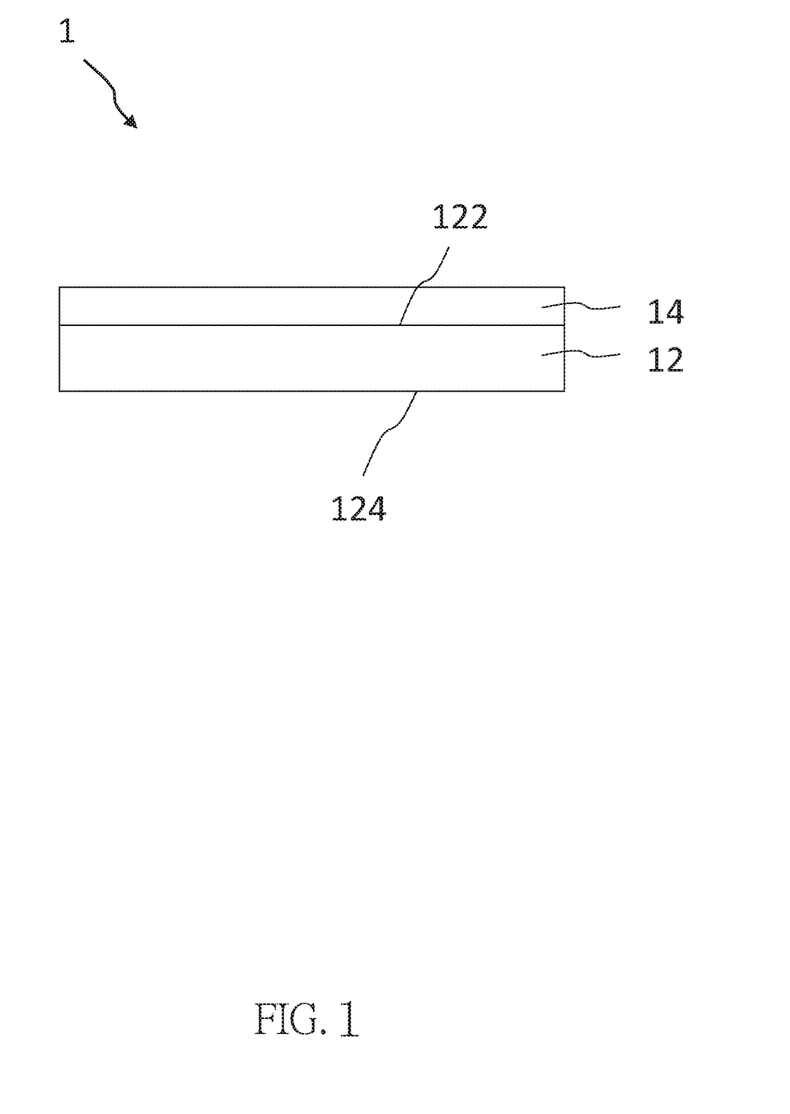
FIG. 1 is a schematic diagram of the stone paper of an embodiment according to the present invention, showing the coextrusion structure of the stone paper.
Figure 2:
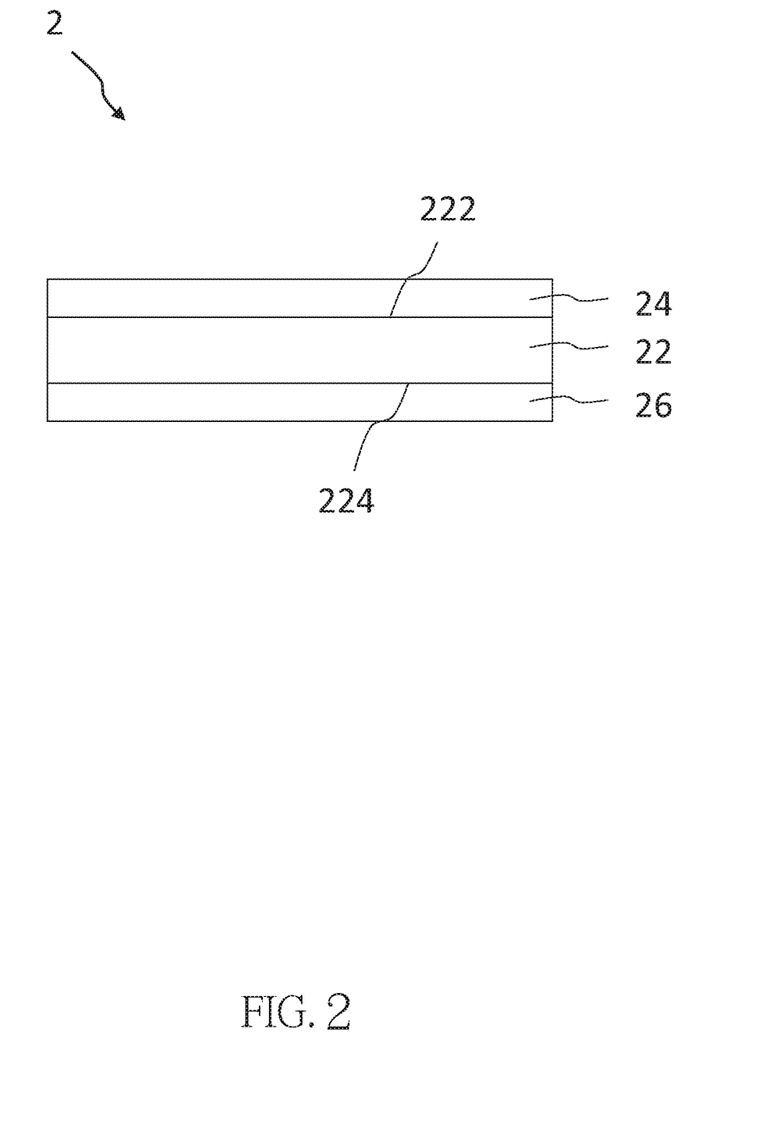
FIG. 2 is a schematic diagram of the stone paper of another embodiment according to the present invention, showing the coextrusion structure of the stone paper.
Figure 3:
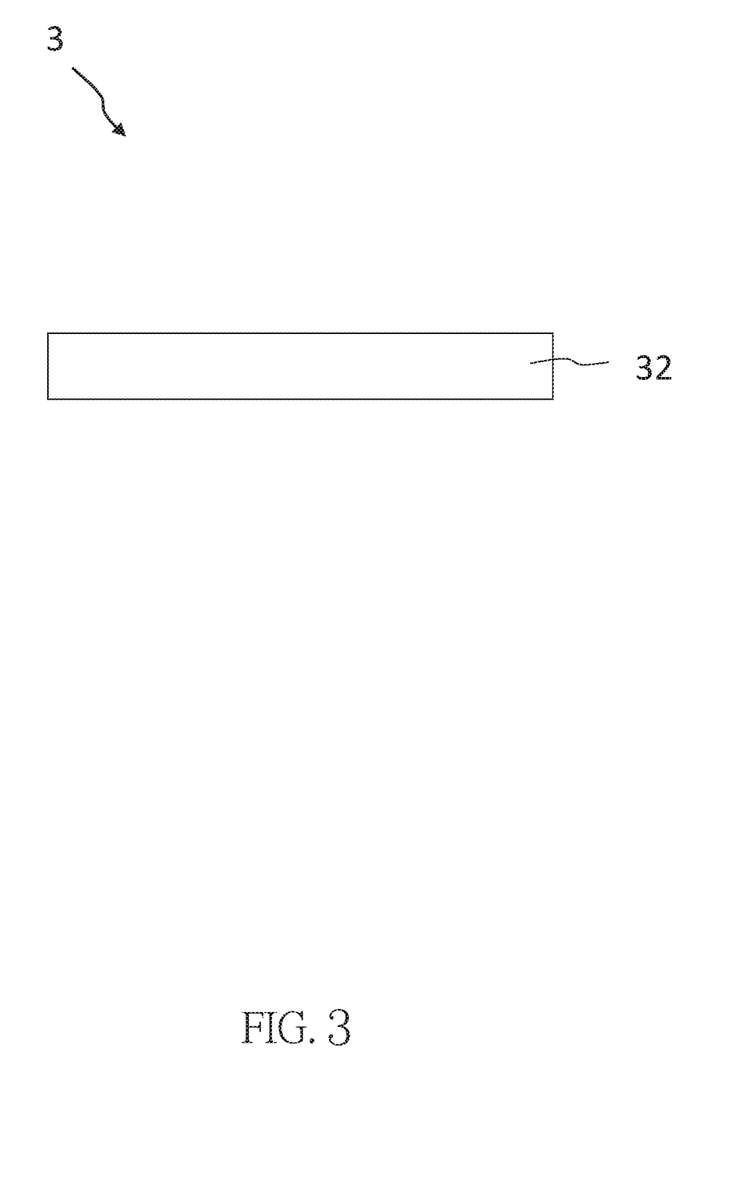
FIG. 3 is a schematic diagram of the stone paper of still another embodiment according to the present invention, showing the coextrusion structure of the stone paper.
Figure 4:
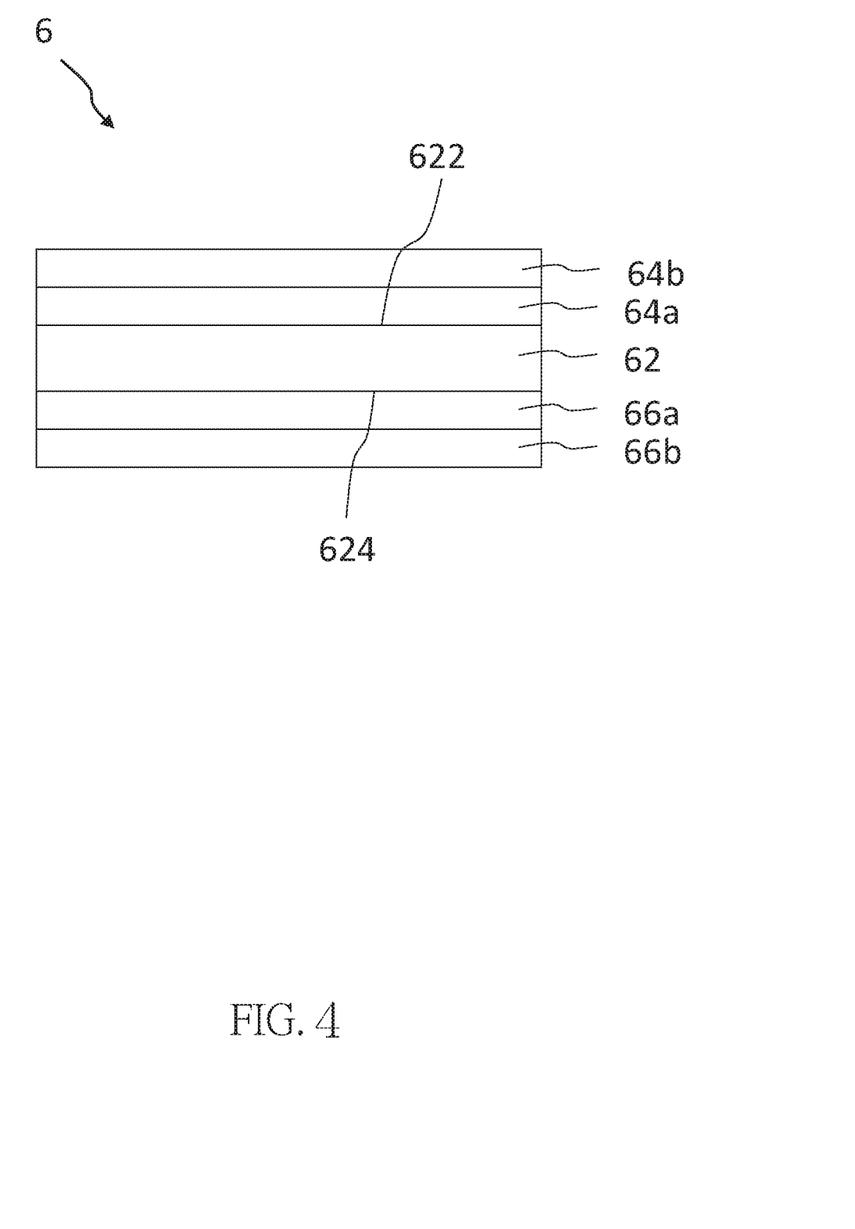
FIG. 4 is a schematic diagram of the stone paper of still another embodiment according to the present invention, showing the coextrusion structure of the stone paper.

Referring to FIGS. 1, 2, and 4, a stone paper 1, 2, 6 of different embodiments according to the present invention includes a first material layer 12, 22, 62 and at least one second material layer 14, 24, 26, 64a, 64b, 66a, 66b. Referring to FIG. 3, a stone paper 3 of another embodiment according to the present invention includes merely a material layer 32. The first material layer 12, 22, 62 (or the material layer 32) includes a first inorganic material 40, a first plastic material, and an additive which are mixed together. The at least one second material layer 14, 24, 26, 64a, 66a is coextruded upon at least one surface 122, 222, 224, 622, 624 of the first material layer 12, 22, 62, wherein the second material layer 14, 24, 26, 64a, 64b, 66a, 66b includes a second inorganic material, a nonmetal thermoconductive material, and a second plastic material which are mixed together. As shown in FIG. 1, in the current embodiment, the second material layer 14 is coextruded upon the surface 122 of the first material layer 12. However, the arrangement of the second material layer is not limited by the aforementioned design. In practice, the second material layer 14 could be coextruded upon the other surface 124 of the first material layer 12 as well. In the current embodiment according to the present invention shown in FIG. 2, one of two second material layers (i.e., the second material layer 24, hereinafter the second material layer 24) of the stone paper 2 is coextruded upon one of two surfaces (i.e., the surface 222, hereinafter the surface 222) of the first material layer 22, and the other second material layer 26 (hereinafter the second material layer 26) is coextruded upon the other surface 224 (hereafter the surface 224) of the first material layer 22. Additionally, in an embodiment according to the present invention, the stone paper 3 could be constituted by a merely single material layer 32, as shown in FIG. 3. In an embodiment of the present invention, one of the second material layers (i.e., the second material layer 64a, hereinafter the second material layer 64a) of the stone paper 6 is coextruded upon one of two surfaces (i.e., the surface 622, hereafter the surface 622) of the first material layer 62, and another second material layer (hereinafter the second material layer 64b) is coextruded upon the second material layer 64a; on the other hands, still another second material layer (hereinafter the second material layer 66a) is coextruded upon the other surface 624 (hereinafter the surface 624) of the first material layer 62, and still another second material layer (hereinafter the second material layer 66b) is coextruded upon the second material layer 66a. In other words, the second material layer 64a is disposed between the first material layer 62 and the second material layer 64b, and the second material layer 66a is disposed between the first material layer 62 and the second material layer 66b, as shown in FIG. 4.

In the embodiments of the present invention, the first inorganic material 40 is 55 wt %-85 wt % based on the first material layer 12, 22, 62 (or the material layer 32); the first plastic material is 10 wt %-40 wt % based on the first material layer 12, 22, 62 (or the material layer 32); the additive is 0.5 wt %-1.5 wt % based on the first material layer 12, 22, 62 (or the material layer 32). In the current embodiments, a sum of the weight percentages of the first inorganic material 40, the first plastic material, and the additive is smaller than or equal to 100 wt % of the first material layer 12, 22, 62. In the current embodiments, the first inorganic material 40 could be a white or creamy yellow inorganic material and is an inorganic powder made by grinding natural stones into powder, wherein a main ingredient of the first inorganic material 40 is calcium carbonate ($CaCO_3$). In the current embodiments, the first inorganic material 40 is the inorganic powder with a grain size of 2-10 micrometer($\mu m$); the first plastic material is consisted of Amorphous Polyethylene Terephthalate (APET) and Poly (ethylene terephthalateco-1,4-cylclohexylenedimethylene terephthalate) (PETG), wherein the first plastic material could withstand temperatures ranging from 132 to 140 degrees Celsius. In the current embodiments, the APET accounts for 85-90 wt % of a weight of the first plastic material; the PETG accounts for 10-15 wt % of the weight of the first plastic material. In the current embodiments, the additive is used as an internal/external lubricant and is adapted to decrease a friction between the compounded ingredients of the first material layer 12, 22, 62 (or the material layer 32) and a pipe line of a processing machine (not shown), thereby to decrease a processing temperature during processing.

In an embodiment, the first material layer 12, 22, 62 (or the material layer 32) further includes a third plastic material, and the third plastic material accounts for less than or equal to 10 wt % of a weight of the first material layer 12, 22, 62 (or the material layer 32). In the current embodiments, a sum of the weight percentages of the first inorganic material 40, the first plastic material, the additive, and the third plastic material is equal to 100 wt % of the first material layer 12, 22, 62. The third plastic material includes polypropylene (PP), high density polyethylene (HDPE), metallocene linear low density polyethylene (MLLDPE), or a combination thereof. In the current embodiment, a Melt Flow Index (also known as IV value) of the third plastic material is 0.05 to 3.0, and the third plastic material could withstand temperature ranging from 125 to 130 degrees Celsius.

In the current embodiment, the second inorganic material is in a range from 20 to 40 wt % based on a weight of the second material layer 14, 24, 26, 64a, 64b, 66a, 66b; the nonmetal thermoconductive material is in a range from 3 to 10 wt % based on the weight of the second material layer 14, 24, 26, 64a, 64b, 66a, 66b; the second plastic material is in a range from 50 to 70 wt % based on the weight of the second material layer 14, 24, 26, 64a, 64b, 66a, 66b. In the current embodiments, the second inorganic material could be a white or creamy yellow inorganic material and is an inorganic powder made by grinding natural stones into powder, wherein a main ingredient of the second inorganic material is calcium carbonate ($CaCO_3$). In the current embodiments, the second inorganic material is the inorganic powder with a grain size of 2-10 µm; the nonmetal thermoconductive material includes a nanomaterial; the second plastic material is consisted of the APET and the PETG and could withstand temperature ranging from 132 to 140 degrees Celsius. In the current embodiments, the APET accounts for 50-70 wt % of a weight of the second plastic material; the PETG accounts for 30-50 wt % of the weight of the second plastic material. In an embodiment, the second plastic material is consisted of the PETG (i.e., the PETG accounts for 100 wt % of the weight of the second plastic material). In the current embodiments, the nanomaterial includes carbon or ceramics, wherein the nanomaterial has a hollow binding structure or a flat structure. In the current embodiments, the second material layer 14, 24, 26, 64a, 64b, 66a, 66b further includes a fourth plastic material, and the fourth plastic material accounts for less than or equal to 10 wt % of the weight of the second material layer 14, 24, 26, 64a, 64b, 66a, 66b. In the current embodiments, a sum of the weight percentages of the second inorganic material, the nonmetal thermoconductive material, the second plastic material, and the fourth plastic material is equal to 100 wt % of the second material layer 14, 24, 26, 64a, 64b, 66a, 66b. The fourth plastic material includes polypropylene (PP), high density polyethylene (HDPE), metallocene linear low density polyethylene (MLLDPE), or a combination thereof. In the current embodiment, a Melt Flow Index (IV value) of the fourth plastic material is 0.05 to 3.0, and the fourth plastic material could withstand temperature ranging from 125 to 130 degrees Celsius.

Figure 5:
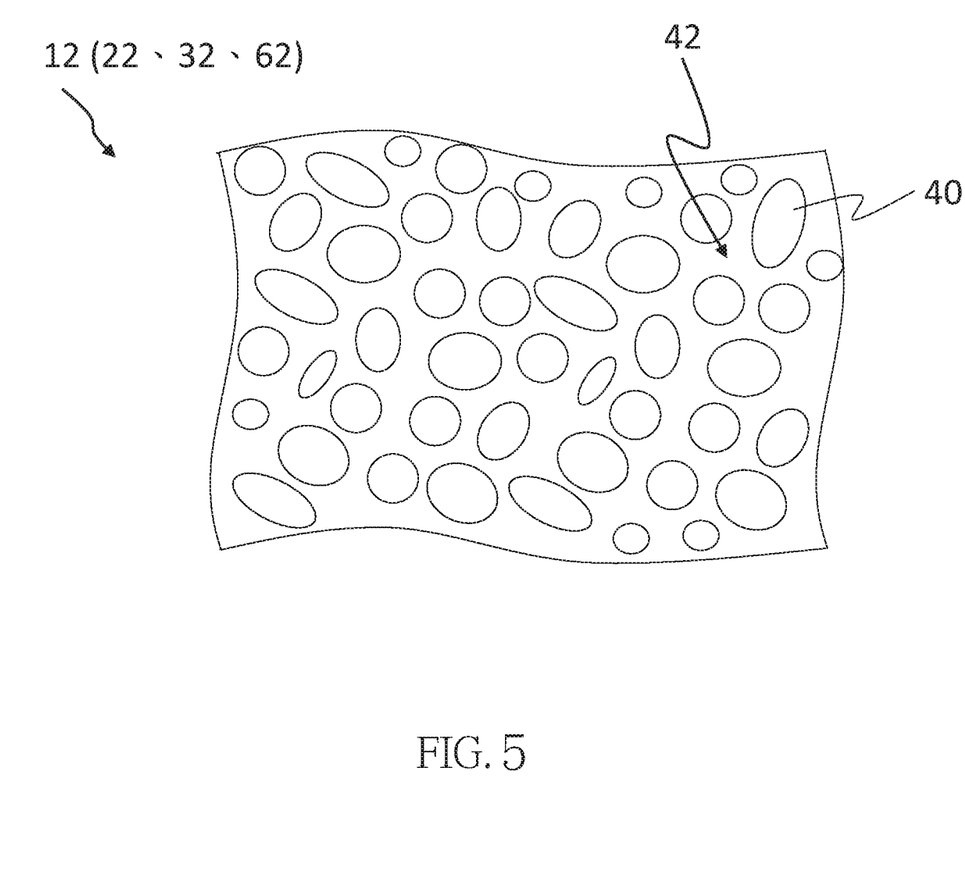
FIG. 5 is an enlarged partial diagram of the stone paper of the embodiments according to the present invention, showing the enlarged first material layer.

As shown in FIG. 5, in a detail structure of the the stone paper 1, 2, 3, 6, the first inorganic material 40 is mixed in the first material layer 12, 22, 62 (or in the material layer 32), and the second inorganic material is mixed in the second material layers 14, 24, 26, 64a, 64b, 66a, 66b; wherein a plurality of voids is formed in the first material layers 12, 22, 62 (or the material layer 32) by the first inorganic material 40; and a plurality of voids is formed in the second material layer 14, 24, 26, 64a, 64b, 66a, 66b by the second inorganic material. Take the first material layer 12, 22, 62 (or the material layer 32) as an example, the voids 42 are formed by the first inorganic material 40 in the first material layers 12, 22, 62 (or the material layer 32), so that a printing ink and a carbon dust could get stuck in the voids 42 to improve the ink absorption properties and the printability of the first material layer 12, 22, 62 (or the material layer 32).

In the current embodiments, a thickness of the first material layer 12, 22, 62 (or the material layer 32) of the stone paper 1, 2, 3, 6 is in a range of 100-200 µm or in a range of 200-250 µm. When the thickness of the first material layer 12, 22, 62 (or the material layer 32) is in the range from 100 to 200 µm, the first plastic material accounts for 38 wt % of the weight of the first material layers 12, 22, 62 (or the material layer 32), and the first inorganic material 40 accounts for 62 wt % of the weight of the first material layers 12, 22, 62 (or the material layer 32). When the thickness of the first material layer 12, 22, 62 (or the material layer 32) is in the range from 200 to 250 µm, the first plastic material accounts for 22 wt % of the weight of the first material layer 12, 22, 62 (or the material layer 32), and the first inorganic material 40 accounts for 78 wt % of the weight of the first material layer 12, 22, 62 (or the material layer 32). In the current embodiments, a thickness of the second material layer 14, 24, 26, 64a, 64b, 66a, 66b of the stone paper 1, 2, 6 is 5-10 µm. In the embodiment shown in FIG. 1, the thickness of the second material layer 14 of the stone paper 1 is 5-10% of a thickness of the stone paper 1. In the embodiment shown in FIG. 2, a total thickness of the two second material layers 24, 26 of the stone paper 2 is 5-10% of a thickness of the stone paper 2. In the embodiment shown in FIG. 4, a total thickness of the four second material layers 64a, 64b, 66a, 66b of the stone paper 6 is 5-10% of a thickness of the stone paper 6.

Figure 6:
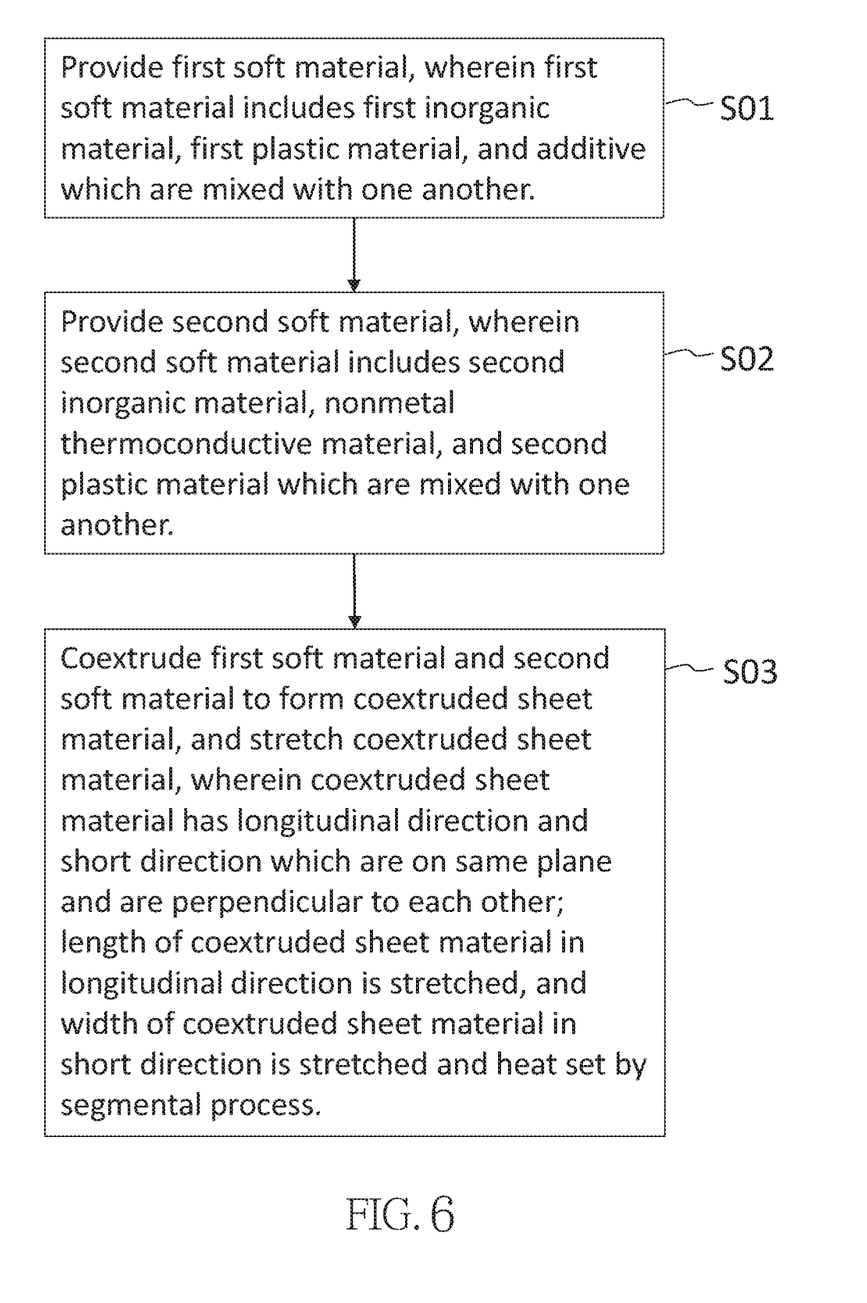
FIG. 6 is a flowchart, showing the processes of the manufacturing method of the stone paper of an embodiment according to the present invention.
Figure 7:
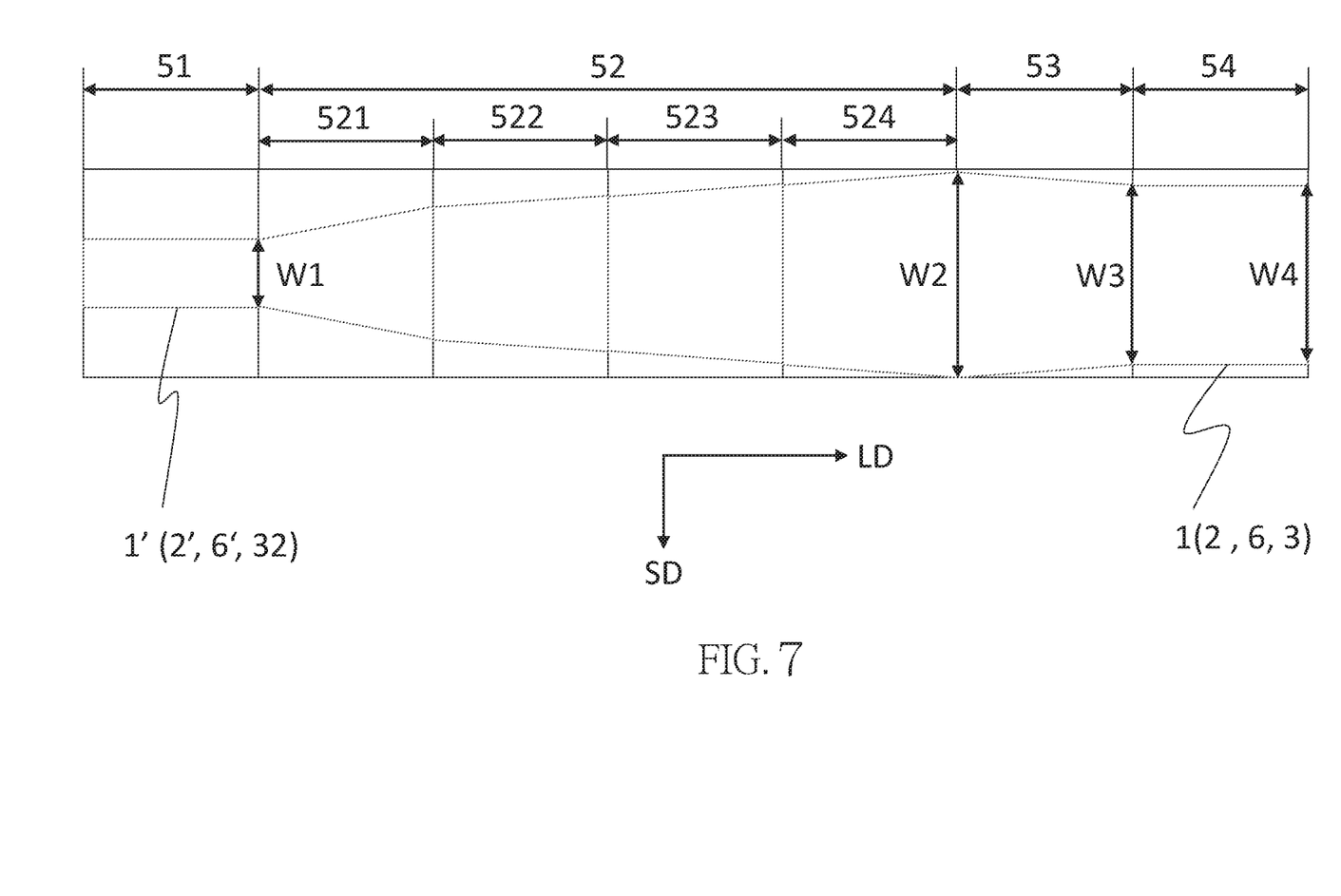
FIG. 7 is a schematic diagram, showing the variation of the coextruded sheet material during the width stretching stage and the heatsetting stage of the manufacturing method of the stone paper of the embodiment according to the present invention.

Referring to FIG. 6 and FIG. 7, a manufacturing method of the stone paper of the embodiments according to the present invention includes at least following steps:

Step S01: a first soft material is provided, wherein the first soft material includes the first inorganic material 40, the first plastic material, and the additive which are mixed with one another.

Step S02: a second soft material is provided, wherein the second soft material includes the second inorganic material, the nonmetal thermoconductive material, and the second plastic material which are mixed with one another; and Step S03: the first soft material and the second soft material are coextruded to form a coextruded sheet material 1', 2', 6', or merely the first soft material is extruded to form the material layer 32. After that, the coextruded sheet material 1', 2', 6' (or the material layer 32) is stretched, wherein the coextruded sheet material 1', 2', 6' (or the material layer 32) has a longitudinal direction LD (also known as machine direction) and a short direction SD (also known as transverse direction) which are on a same plane and are perpendicular to each other. In the current embodiments, a length of the coextruded sheet material 1', 2', 6' (or the material layer 32) in the longitudinal direction LD is stretched; a width of the coextruded sheet material 1', 2', 6' (or the material layer 32) in the short direction SD is stretched and heat set by a segmental process. In the current embodiment, the coextruded sheet material 1' includes the first material layer 12 and the second material layer 14 which is coextruded with the first material layer 12, wherein the first soft material forms the first material layer 12, and the second soft material forms the second material layer 14; in another embodiment, the coextruded sheet material 2' includes the first material layer 22 and the second material layers 24, 26, wherein the first material layer 22 is located between the second material layer 24 and the second material layer 26; in still another embodiment, the coextruded sheet materials 6' includes the first material layer 62 and the second materials layers 64a, 64b, 66a, 66b, wherein the second material layer 64a is coextruded upon the surface 622 of the first material layer 62, and the second material layer 64b is coextruded upon the second material layer 64a; the second material layer 66a is coextruded upon the other surface 624 of the first material layer 62, and the second material layer 66b is coextruded upon the second material layer 66a. In other words, the second material layer 64a is disposed between the first material layer 62 and the second material layer 64b, and the second material layer 66a is disposed between the first material layer 62 and the second material layer 66b.

In the current embodiment, the first inorganic material 40 accounts for 55-85 wt % of the weight of the first material layer 12, 22, 62 (or the material layer 32); the first plastic material accounts for 10-40 wt % of the weight of the first material layer 12, 22, 62 (or the material layer 32); the additive accounts for 0.5-1.5 wt % of the weight of the first material layer 12, 22, 62 (or the material layer 32). The second inorganic material accounts for 20-40 wt % of the weight of the second material layer 14, 24, 26, 64a, 64b, 66a, 66b; the nonmetal thermoconductive material accounts for 3-10 wt % of the weight of the second material layer 14, 24, 26, 64a, 64b, 66a, 66b; the second plastic material accounts for 50-70 wt % of the weight of the second material layer 14, 24, 26, 64a, 64b, 66a, 66b. In the current embodiment, the first material layer 12, 22, 62 (or the material layer 32) further includes a third plastic material, and the third plastic material is less than or equal to 10 wt % of the weight of the first material layer 12, 22, 62 (or the material layer 32); the second material layer 14, 24, 26, 64a, 64b, 66a, 66b further includes a fourth plastic material, and the fourth plastic material is less than or equal to 10 wt % of the weight of the second material layer 14, 24, 26, 64a, 64b, 66a, 66b.

In step S01, the first soft material is formed by taking a mixing process (e.g. a kneading process) to mix the first inorganic material 40, the first plastic material, and the additive. In the current embodiments, a rotation speed in the mixing process is 150-500 rpm; a temperature in the mixing process is 130-225 degrees Celsius; and a pressure in the mixing process after cooling is 0.5-3 t/cm2. In the current embodiments, the first soft material is formed by mixing the first inorganic material 40, and the first plastic material. In an embodiment, in step S01, the first soft material is provided by extruding the first soft material to form a first soft film. A main ingredient of the first inorganic material 40 is calcium carbonate. In the current embodiments, the first soft material is consisted of the first inorganic material 40 of 79 wt %, the first plastic material of 20 wt %, and the additive of 1 wt %, wherein the first plastic material is consisted of the APET of 80-90 wt % and the PETG of 10-20 wt %.

In step S02, the second soft material is formed by mixing the second inorganic material, the nonmetal thermoconductive material, and the second plastic material under 180-190 degrees Celsius. In an embodiment, in step S02, the second soft material is provided by extruding the second soft material to form a second soft film. In the current embodiments, the APET accounts for 70 wt % of the weight of the second plastic material, and the PETG accounts for 30 wt % of the weight of the second plastic material. In an embodiment, the second plastic material is composed of the PETG (i.e., the PETG accounts for 100 wt % of the weight of the second plastic material). In an embodiment that the stone paper 3 is constituted by the merely single material layer 32, step S02 could be skipped.

In step S03, the first soft material and the second soft material are coextruded to form the coextruded sheet material 1', 2', 6', or merely the first soft material is extruded to form the material layer 32. In an embodiment, the coextruded sheet material 1', 2', 6' is formed by coextruding the first soft film and the second soft film. In the current embodiment, the coextruded sheet material 1' includes the first material layer 12 and the second material layer 14 which is coextruded with the first material layer 12; in another embodiment, the coextruded sheet material 2' includes the first material layer 22 and the second material layers 24, 26, wherein the first material layer 22 is located between the second material layer 24 and the second material layer 26; in still another embodiment, the coextruded sheet materials 6' includes the first material layer 62 and the second materials layers 64a, 64b, 66a, 66b, wherein the second material layer 64a is coextruded upon the surface 622 of the first material layer 62, and the second material layer 64b is coextruded upon the second material layer 64a; the second material layer 66a is coextruded upon the other surface 624 of the first material layer 62, and the second material layer 66b is coextruded upon the second material layer 66a. In other words, the second material layer 64a is disposed between the first material layer 62 and the second material layer 64b, and the second material layer 66a is disposed between the first material layer 62 and the second material layer 66b.

Referring to FIG. 7, the segmental process includes a material feeding stage 51, a width stretching stage 52, a heatsetting stage 53, and a cooling stage 54.

During the material feeding stage 51, the coextruded sheet material 1', 2', 6' (or the material layer 32) has an initial width W1 in the short direction SD. In the current embodiments, a thickness of the coextruded sheet material 1', 2', 6' (or the material layer 32) at the material feeding stage 51 is in a range between 400 µm to 1000 µm and a temperature at the material feeding stage 51 is in a range of 130 to 150 degrees Celsius. During the width stretching stage 52, the coextruded sheet material 1', 2', 6' (or the material layer 32) has a plurality of stretching widths in the short direction SD. In the current embodiments, the stretching widths are in a range between the initial width W1 and a maximum width W2, wherein the width of the coextruded sheet material 1', 2', 6' (or the material layer 32) in the short direction SD is extended gradually from the initial width W1 to the maximum width W2 at the width stretching stage 52. In the current embodiments, the width stretching stage 52 could be further divided into a first sub-stage 521, a second sub-stage 522, a third sub-stage 523, and a fourth sub-stage 524, wherein the width of the coextruded sheet material 1', 2', 6' (or the material layer 32) in the short direction SD is increased gradually and sequentially in the first sub-stage 521, the second sub-stage 522, the third sub-stage 523, and the fourth sub-stage 524. In the current embodiments, a temperature in the width stretching stage 52 is in a range from 110 to 145 degrees Celsius; the width of the coextruded sheet material 1', 2', 6' (or the material layer 32) in short direction SD in the width stretching stage 52 is in a range from 3000 µm to 5600 µm. In the current embodiments, the thickness of the coextruded sheet material 1', 2', 6' (or the material layer 32) in the width stretching stage 52 is in a range from 380 µm to 400 µm. In the current embodiments, the width of the coextruded sheet material 1', 2', 6' (or the material layer 32) has the greatest stretching slope in the first sub-stage 521 than in the second sub-stage 522, in the third sub-stage 523, and the fourth sub-stage 524.

During the heatsetting stage 53, the coextruded sheet material 1', 2', 6' (or the material layer 32) has a heat-shrink width W3 in the short direction SD after the coextruded sheet material 1', 2', 6' (or the material layer 32) is heated and shrinks. In the current embodiments, the heat-shrink width W3 is greater than the initial width W1 and is smaller than the maximum width W2. In the heatsetting stage 53, the width in the short direction SD of the coextruded sheet material 1', 2', 6' (or the material layer 32) decreases gradually from the maximum width W2 to the heat-shrink width W3. In the current embodiments, a temperature in the heatsetting stage 53 is in a range from 180 to 210 degrees Celsius; the heat-shrink width W3 ranges from 4800 μm to 5500 μm. With the heatsetting stage 53 and a memory effect of the plastic, the heat-shrink effect of the coextruded sheet material 1', 2', 6' (or the material layer 32) during printing or copying could be effectively reduced.

In the current embodiments according to the present invention, after the cooling stage 54, the coextruded sheet material 1', 2', 6' (or the material layer 32) is turned into the stone paper 1, 2, 3, 6. During the cooling stage 54, the coextruded sheet material 1', 2', 6' (or the material layer 32) (i.e., the stone paper 1, 2, 3, 6) has a final width W4 in the short direction SD after the coextruded sheet material 1', 2', 6' (or the material layer 32) is cooled down, wherein the final width W4 is smaller than or equal to the heat-shrink width W3. In the cooling stage 54, the coextruded sheet material 1', 2', 6' (or the material layer 32) (i.e., the stone paper 1, 2, 3, 6) is kept at a temperature of 30-50 degrees Celsius or at a room temperature. The width of the coextruded sheet material 1', 2', 6' (or the material layer 32) in the short direction SD (i.e., the width of the stone paper 1, 2, 3, 6 in the short direction SD) in the cooling stage 54 is the final width W4 ranged between 4800 μm and 5200 μm.

In the current embodiments, in the segmental process, the coextruded sheet material 1', 2', 6' (or the material layer 32) is compressed and stretched by a plurality of rollers (not shown), wherein some of the rollers are in pair to form at least one roller group. A part of a surface of one of the two rollers of the at least one roller group contacts with a part of a surface of the other roller of the at least one roller group, so that the coextruded sheet material 1', 2', 6' (or the material layer 32) could be compressed tightly, thereby to make the coextruded sheet material 1', 2', 6' (or the material layer 32) has a predetermined thickness. When the length of the coextruded sheet material 1', 2', 6' (or the material layer 32) in the longitudinal direction LD is stretched, the two rollers of the roller group rotate with a rotational speed of 200-250 rpm, and a temperature at the segmental process is between 100 and 120 degrees Celsius, wherein a temperature of the coextruded sheet material 1', 2', 6' (or the material layer 32) is 180-195 degrees Celsius. In the current embodiments, a stretch ratio that the length of the coextruded sheet material 1', 2', 6' (or the material layer 32) in the longitudinal direction LD is stretched is 15%-300%.

In the current embodiments, the thickness of the first material layer 12, 22, 62 (or the material layer 32) of the stone paper 1, 2, 3, 6 is in a range of 100-200 μm or in a range of 200-250 μm. When the thickness of the first material layers 12, 22, 62 (or the material layer 32) is in range from 100 to 200 μm, the first plastic material accounts for 38 wt % of the weight of the first material layers 12, 22, 62 (or the material layer 32), and the first inorganic material 40 accounts for 62 wt % of the first material layers 12, 22, 62 (or the material layer 32). When the thickness of the first material layers 12, 22, 62 (or the material layer 32) is in range from 200 to 250 μm, the first plastic material accounts for 22 wt % of the weight of the first material layers 12, 22, 62 (or the material layer 32), and the first inorganic material 40 accounts for 78 wt % of the first material layers 12, 22, 62 (or the material layer 32). In the current embodiment, the thickness of the second material layer 14, 24, 26, 64a, 64b, 66a, 66b of the stone paper 1, 2, 6 is 5-10 μm. In the embodiment shown in FIG. 1, the thickness of the second material layer 14 of the stone paper 1 is 5-10% of the thickness of the stone paper 1. In the embodiment shown in FIG. 2, the total thickness of the two second material layers 24, 26 of the stone paper 2 is 5-10% of the thickness of the stone paper 2. In the embodiment shown in FIG. 4, the total thickness of the four second material layers 64a, 64b, 66a, 66b of the stone paper 6 is 5-10% of the thickness of the stone paper 6. The nanomaterial of the nonmetal thermoconductive material has characteristics of fast heat conduction, fast heat dissipation, and conductivity, so that the stone paper 1, 2, 3, 6 could withstand heat and has anti-static ability.

Figure 8:
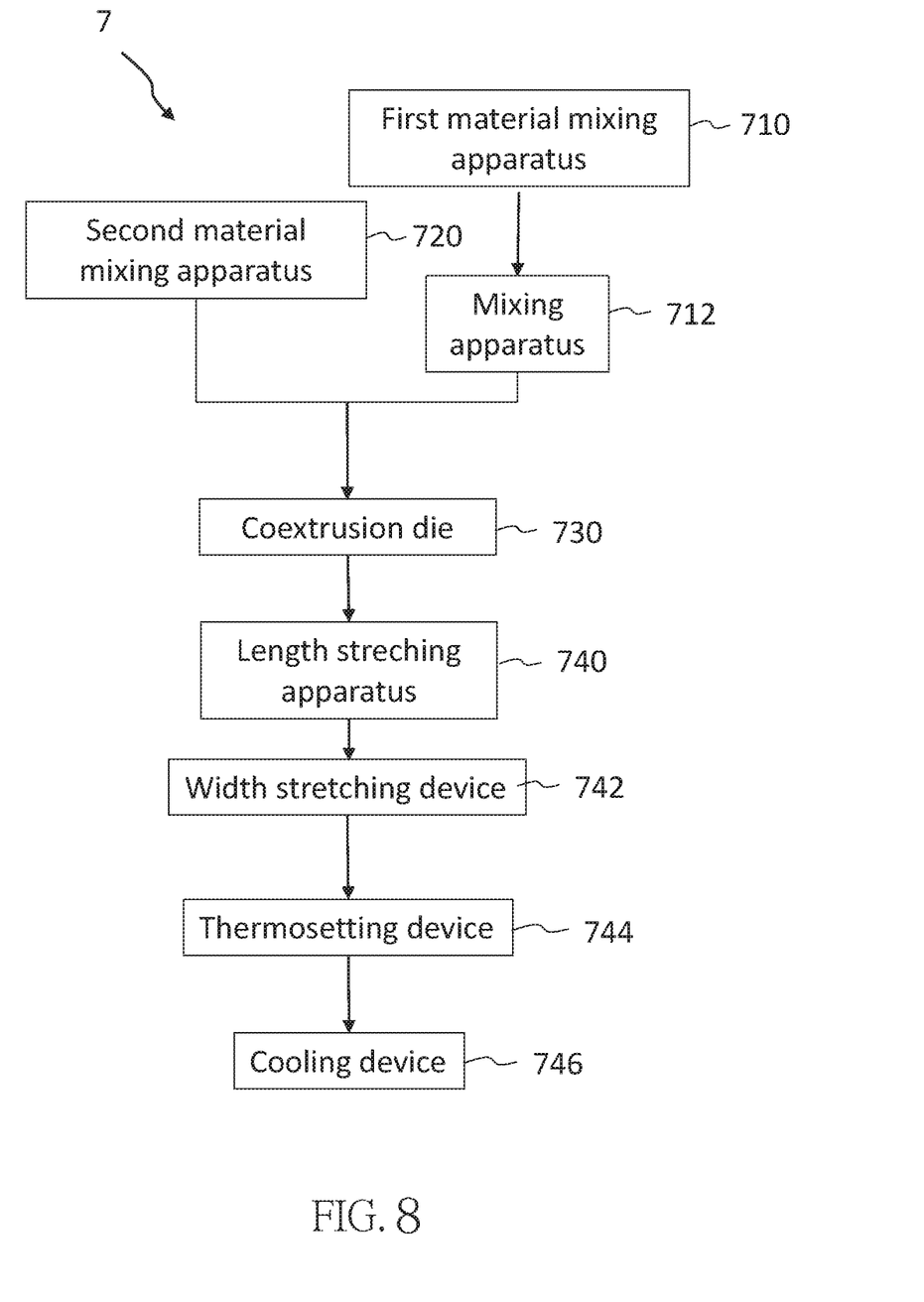
FIG. 8 is a schematic diagram, showing the manufacturing system of the stone paper of an embodiment according to the present invention.

Referring to FIG. 8, a stone paper manufacturing system 7, which is adapted to apply said manufacturing method of the embodiments according to the present invention, includes a first material mixing apparatus 710, a second material mixing apparatus 720, a coextrusion die (manifold extrusion) 730, and a length stretching apparatus 740. The first material mixing apparatus 710 is adapted to provide the first soft material. The second material mixing apparatus 720 is adapted to provide the second soft material. The coextrusion die 730 is connected to the first material mixing apparatus 710 and the second material mixing apparatus 720 respectively and is adapted to provide the coextruded sheet material 1', 2', 6' which comprises the first material layer 12, 22, 62 and the at least one second material layer 14, 24, 26, 64a, 66a, wherein the at least one second material layer 14, 24, 26, 64a, 66a is coextruded upon at least one of surfaces of the first material layer 12, 22, 62 to form the coextruded sheet material 1', 2', 6'. The length stretching apparatus 740 is connected to the coextrusion die 730 and is adapted to compress and stretch the coextruded sheet material 1', 2', 6', wherein the coextruded sheet material 1', 2', 6' has the longitudinal direction LD and the short direction SD on the same plane, and the short direction SD is perpendicular to the longitudinal direction LD. In the current embodiments, the length of the coextruded sheet material 1', 2', 6' in longitudinal direction LD is stretched, and the width of the coextruded sheet material 1', 2', 6' in short direction SD is stretched and heat set by the segmental process.

In the current embodiments, the first material mixing apparatus 710 includes a mixing apparatus 712 which is adapted to mix the first inorganic material 40, the first plastic material, and the additive to form the first soft material, wherein an operating rotational speed of the mixing apparatus 712 is 150-500 rpm, and a processing temperature of the mixing apparatus 712 is 130-180 degrees Celsius; a pressure of the mixing apparatus 712 after cooling down is 0.5-3 t/cm2. In the current embodiments, the first material mixing apparatus 710 further includes an extruder for extruding the first soft material to form the first soft film.

In the current embodiments, the second material mixing apparatus 720 includes an extruder for extruding the second soft material to from the second soft film. After that, the coextrusion die 730 is utilized to stack the second soft film upon at least one surface of the first soft film.

In the current embodiments, the length stretching apparatus 740 includes a width stretching device 742 and a thermosetting device 744, wherein the thermosetting device 744 is connected to the width stretching device 712. In the width stretching device 742, the coextruded sheet material 1', 2', 6' has the plurality of stretching widths in the short direction SD; in the thermosetting device 744, the coextruded sheet material 1', 2', 6' has the heat-shrink width W3 in the short direction SD. In the current embodiments, the stretching widths is in the range between the initial width W1 and the maximum width, wherein the heat-shrink width W3 is greater than the initial width W1 and is smaller than the maximum width. In the current embodiments, in the width stretching device 742, the width of the coextruded sheet material 1', 2', 6' in the short direction SD is elongated gradually from the initial width W1 to the maximum width W2. In the current embodiments, in the thermosetting device 744, the width of the coextruded sheet material 1', 2', 6' in the short direction SD is shortened gradually from the maximum width W2 to the heat-shrink width W3.

In the current embodiments, the length stretching apparatus 740 includes a cooling device 746 which is connected to the thermosetting device 744. In the cooling device 746, the coextruded sheet material 1', 2', 6' has the final width W4 in the short direction SD, wherein the final width W4 is smaller than or equal to the heat-shrink width W3. In the current embodiments, in the cooling device 746, a temperature of the coextruded sheet material 1', 2', 6' is kept in 30-50 degrees Celsius.

In the current embodiments, in the length stretching apparatus 740, the coextruded sheet material 1', 2', 6' is compressed and stretched by the plurality of rollers, wherein some of the rollers are in pair to form the at least one roller group, a portion of the surface of one of the two rollers of the at least one roller group contacts with a portion of the surface of the other roller of the at least one roller group.

Figure 9:
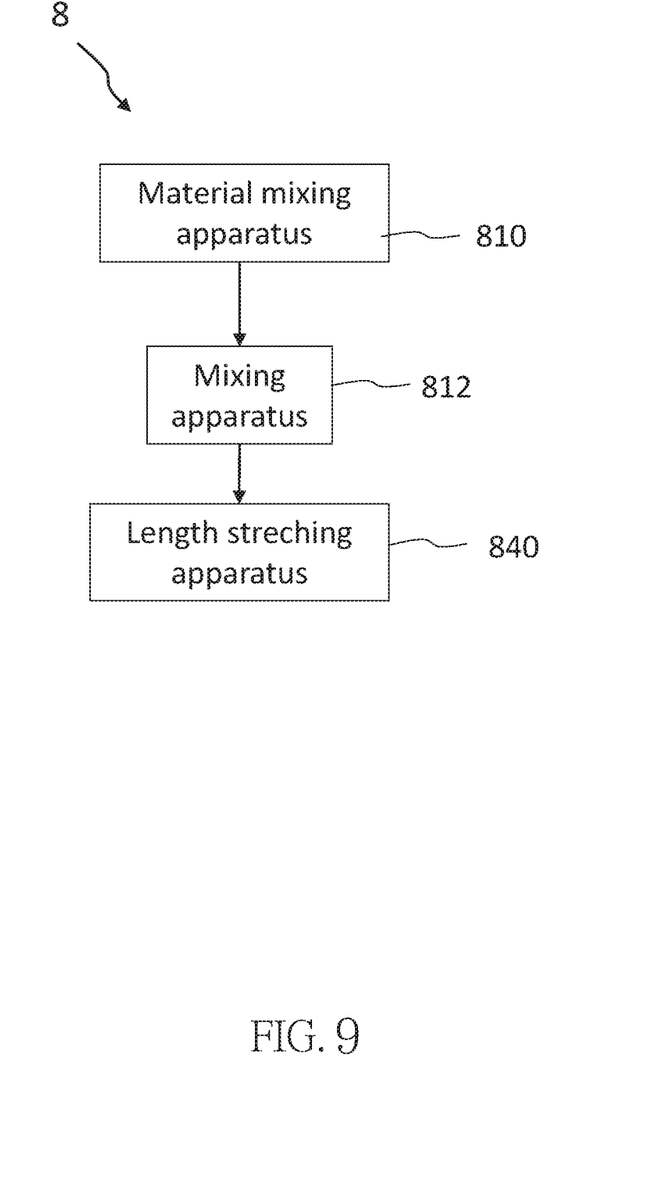
FIG. 9 is a schematic diagram, showing the manufacturing system diagram of the stone paper of another embodiment according to the present invention.

Referring to FIG. 9, a stone paper manufacturing system 8 of another embodiment according to the present invention includes a material mixing apparatus 810 and a length stretching apparatus 840. The material mixing apparatus 810 includes a mixing apparatus 812 for mixing the first inorganic material 40, the first plastic material, and the additives to form the first soft material, wherein an operating rotational speed of the mixing apparatus 812 is 150-500 rpm, and a processing temperature of the mixing apparatus 812 is 130-180 degree Celsius; a pressure of the mixing apparatus 812 after cooling is 0.5-3 t/cm2. In the current embodiment, the material mixing apparatus 810 includes the extruder for extruding the first soft material into the first soft film. After that, the length stretching apparatus 840 is utilized to stretch the first soft film in a longitudinal direction LD, and a width of the first soft film in a short direction SD is stretched and heat set by the segmental process to form the material layer 32. In the current embodiment, the longitudinal direction LD and the short direction SD of the first soft film are in the same plane and are perpendicular to each other.

With the aforementioned design, the stone paper is made from the inorganic powder made by grinding natural stones, the nonmetal thermoconductive material, and a little of the plastic material for binding the materials. Therefore, the stone paper provided by the present invention could completely avoid using the wood pulp. Besides, since the nonmetal thermoconductive material is mixed in the stone paper provided by the present invention, the stone paper has significant heat resistance and anti-static performances, so that the stone paper provided by the present invention has great heat resistant and anti-static ability and could be directly used by the printer and printing apparatus on the market. Moreover, the manufacturing method of the stone paper provided by the present invention includes the segmental process utilized to stretch and heat set the width of the coextruded sheet material in short direction, so that the stone paper made by the manufacturing method of the stone paper provided by the present invention has better anti heat shrink ability and is suitable to be used by the printer and the printing apparatus on the market.

It must be pointed out that the embodiment described above is only a preferred embodiment of the present invention. All equivalent structures and methods which employ the concepts disclosed in this specification and the appended claims should fall within the scope of the present invention.

What is claimed is:

1. A stone paper, comprising:
a first material layer comprising a first inorganic material, a first plastic material, and an additive which are mixed together; the first inorganic material is an inorganic powder, and the first plastic material consists of Amorphous Polyethylene Terephthalate (APET) and Poly (ethylene terephthalate-co-1,4,-cyclohexylenedimethylene terephthalate) (PETG), wherein the APET accounts for 85-90 wt % of a weight of the first plastic material; the PETG accounts for 10-15 wt % of the weight of the first plastic material;
wherein the additive is used as a lubricant and is adapted to decrease friction between the materials of the first material layer and a pipeline of a processing machine; and
wherein the first inorganic material accounts for 55-85 wt % of a weight of the first material layer; the first plastic material accounts for 10-40 wt % of the weight of the first material layer; and the additive accounts for 0.5-1.5 wt % of the weight of the first material layer.

2. The stone paper of claim 1, wherein the first material layer further comprises another plastic material, and the another plastic material accounts for less than or equal to 10 wt % of a weight of the first material layer and is selected from a group consisting of polypropylene (PP), high density polyethylene (HDPE), metallocene linear low density polyethylene (MLLDPE), and a combination thereof.

3. The stone paper of claim 1, further comprising at least one second material layer disposed on the first material layer, wherein the second material layer comprises a second inorganic material, a nonmetal thermoconductive material, and a second plastic material which are mixed together.

4. The stone paper of claim 3, wherein the second material layer further comprises an additional plastic material, and the additional plastic material accounts for less than or equal to 10 wt % of the weight of the second material layer; the additional plastic material is selected from a group consisting of polypropylene (PP), high density polyethylene (HDPE), metallocene linear low density polyethylene (MLLDPE), and a combination thereof, wherein a Melt Flow Index (IV value) of the additional plastic material of the second material layer is 0.05 to 3.0.

5. The stone paper of claim 3, wherein the second inorganic material is in a range from 20 to 40 wt % based on a weight of the second material layer; the nonmetal thermoconductive material is in a range from 3 to 10 wt % based on the weight of the second material layer; and the second plastic material is in a range from 50 to 70 wt % based on the weight of the second material layer.

6. The stone paper of claim 3, wherein the second inorganic material is an inorganic powder; the nonmetal thermoconductive material comprises a nanomaterial, wherein the nanomaterial has a flat structure; the second plastic material is consisted of APET and PETG.

\* \* \* \* \*